United States Patent Office 2,708,207
Patented May 10, 1955

2,708,207
BIS QUATERNARY AMMONIUM COMPOUNDS

Emil Girod, Riehen, near Basel, Switzerland, assignor to J. R. Geigy A. G., Basel, Switzerland No Drawing. Application April 17, 1953,
Serial No. 349,550

Claims priority, application Switzerland April 21, 1952

3 Claims. (Cl. 260—567.6)

This invention concerns new diammonium compounds of the general formula:

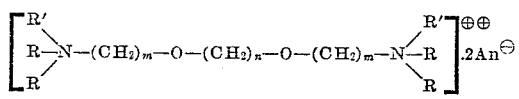  I wherein

represents low molecular dialkylamino groups, piperidino, methyl-piperidino, pyrrolidino, methyl-pyrrolidino, morpholino or methyl-morpholino groups, R' represents benzyl radicals which can also be substituted by low molecular alkyl groups, similar alkoxy groups, a methylendioxy group and/or halogen atoms in the benzene nucleus, $m$ represents whole numbers from 2 to 4, $n$ represents a whole number from 8 to 20, and An$^{\ominus}$ represents a monovalent anion, in particular of halogen hydracids or a normal equivalent of a polyvalent anion.

Such compounds can be produced by reacting ditertiary bisaminoalkoxy-alkanes of the general formula

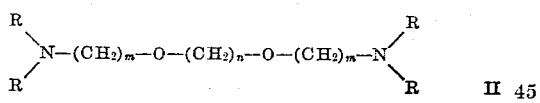  II with 2 mols of benzyl halides of the general formula

R'—Hal    III whereby

R', $m$ and $n$ have the meanings given above and Hal represents a halogen atom.

Insofar as the group

in the end product is represented by a low molecular dialkylamino group (R=low molecular alkyl radical), also a ditertiary bis-aminoalkoxy-alkane of the general formula:

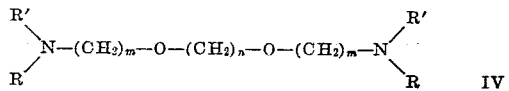  IV can be treated with a reactive alkyl compound of the general formulae:

 

or        V, VI, VII

Finally 2 mols of tertiary amines of the general formula

  VIII can be reacted with a bis-halogenalkoxy-alkane of the general formula:

Hal—(CH$_2$)$_m$—O—(CH$_2$)$_n$—O—(CH$_2$)$_m$—Hal
IX

The ditertiary bis-(aminoalkoxy)-alkanes of the general Formula II necessary as starting materials for the general process first named above can be obtained for example, by reacting $\alpha,\omega$-alkane diols of the general formula:

HO—(CH$_2$)$_n$—OH preferably in the form of their metal compounds (alcoholates) with 2 mols of tertiary aminoalkyl halides of the general formula:

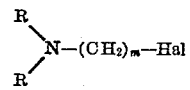

or by reacting $\alpha,\omega$-dihalogen alkanes of the general formula

Hal—(CH$_2$)$_n$—Hal with 2 mols of tertiary aminoalcohols of the general formula

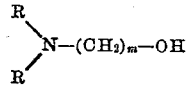

also advantageously in the form of their metal compounds. The second process is to be preferred when the corresponding tertiary aminoalkyl halides which are necessary in the first process are very instable, such as e. g. for the production of ditertiary bis-($\delta$-aminobutoxy)-alkanes. It is also possible, however, to react the bis-(halogenalkoxy) alkanes of the general Formula IX with secondary amines of the general formula

instead of with tertiary amines in order to obtain the ditertiary bis-aminoalkoxy-alkanes of the general Formula II.

The following can be named for example as ditertiary bisaminoalkoxy-alkanes:

1,8 - bis - ($\beta$ - dimethylamino - ethoxy) - octane, B. P. 0.05 142–144°, 1,8 - bis - ($\beta$ - diethylamino - ethoxy) - octane, B. P. 0.03 156–158°, 1,8 - bis - ($\gamma$ - diethylamino - propoxy) - octane, B. P. 0.05 163–165°, 1,9 - bis - ($\beta$ - dimethylamino-ethoxy)-nonane, B. P. 0.06 148–150°, 1,9 - bis - ($\beta$ - diethylamino-ethoxy) - nonane, B. P. 0.03 154–159°, 1,10 - bis - ($\beta$ - dimethylamino - ethoxy) - decane, B. P. 0.04 134–137°, 1,10 - bis - ($\beta$ - diethylamino - ethoxy) - decane, B. P. 0.035 153–157°, 1,10 - bis - ($\beta$ - pyrrolidino - ethoxy) - decane, dihydrobromide, M. P. 154°, 1,10 - bis - ($\beta$ - piperidino - ethoxy) - decane, B. P. 0.04 159–168°, 1,10 - bis - ($\beta$ - morpholino - ethoxy) - decane, B. P. 0.15 211–215°, 1 - (β - dimethylamino - ethoxy) - 10 - (γ - diethylamino-propoxy)-decane, B. P. $_{0.07}$ 153–158°, 1 - (β - diethylamino - ethoxy) - 10 - (γ - dimethylamino-propoxy)-decane, B. P. $_{0.03}$ 144–149°, 1,10 - bis - (γ - dimethylamino - propoxy) - decane, B. P. $_{0.02}$ 140–144°, 1,10 - bis - (γ - diethylamino - propoxy) - decane, B. P. $_{0.03}$ 164–169°, 1,10 - bis - (γ - dibutylamino - propoxy) - decane, B. P. $_{0.09}$ 230–231°, 1,11 - bis - (β - dimethylamino - ethoxy) - undecane, 1,12-bis-(γ-diethylamino-propoxy)-dodecane, 1,14-bis-(β-diethylamino-ethoxy)-tetradecane, 1,15-bis-(δ-dimethylamino-butoxy)-pentadecane, 1,16-bis-(β-dimethylamino-ethoxy)-hexadecane, 1,16-bis-(γ-dimethylamino-propoxy)-hexadecane, 1,18-bis-(β-diethylamino-ethoxy)-octadecane, 1,20-bis-(β-dimethylamino-ethoxy)-eicosane.

The following can be used for example as benzyl halides of the general formula:

$$R'—Hal \qquad III$$

for reaction with the ditertiary bis-aminoalkoxy-alkanes: benzyl chloride, bromide and iodide, 2-methyl-, 3-methyl- and 4-ethyl-benzyl chloride and -benzyl bromide, 3,5-dimethyl-benzyl chloride and -benzyl bromide, 4-isopropyl-benzyl chloride and -benzyl bromide, 2-methoxy-, 3-methoxy-, 4-methoxy-benzyl chloride and -benzyl bromide, 3,4-dimethoxy-benzyl bromide, 3,4-methylendioxy-benzyl bromide, 2-, 3- and 4-chloro-benzyl chloride and -benzyl bromide, 2-, 3- and 4-bromo-benzyl chloride and -benzyl bromide.

If in the processes given above for the production of ditertiary bis-(aminoalkoxy)-alkanes, compounds are used as starting materials which contain a benzyl-alkylamino group instead of the dialkylamino group, starting materials are obtained in a similar manner for the second general process given above for the production of the diammonium compounds, e. g. 1,10-bis-(β-(benzylmethyl-amino)-ethoxy)decane or 1,10 - bis - (γ-(benzylmethyl-amino)-propoxy)-decane. These compounds are obtained by reacting tertiary aminoalkyl halides of the general formula

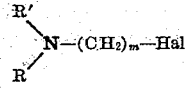

with metal compounds of α,ω-alkane diols, or tertiary amino alcohols of the general formula

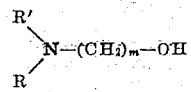

with α,ω-dihalogen alkanes, also N-alkyl-benzylamines of the general formula

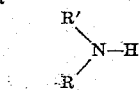

can be reacted with bis-(halogenalkoxy)-alkanes of the general Formula IX.

In addition for the production of such starting materials, also diprimary bis-(aminoalkoxy)-alkanes for example such as the bis-(aminopropoxy)-alkanes which are easily accessible by reacting α,ω-alkane diols with 2 mols of acrylonitrile and subsequent hydrogenation, can be reacted under reducing and hydrogenating conditions with 2 mols of benzaldehyde if desired substituted by low molecular alkyl or alkoxy groups, a methylene dioxy group and/or halogen atoms. The bis-(benzylamino-alkoxy)-alkanes obtained are then either converted into bis-(benzyl-alkylamino-alkoxy)-alkanes of the general Formula IV or into the desired diammonium compounds of the general Formula I in one process without isolating the ditertiary intermediate products named above. Both from this possible method of production of the ditertiary starting materials and from the easy accessibility of the N-alkylbenzylamines produced from benzaldehyde, substituted if desired, and monoalkylamines, it can be seen that the second general process for the production of diammonium compounds may be used chiefly when the substituted benzyl halides necessary for the first general production process are less easily accessible or less easy to use because of instability than the corresponding substituted benzaldehydes.

As reactive alkyl compounds which can be reacted with bis-(benzyl-alkylamino-alkoxy)-alkanes according to the second general produtiton process can be named for example: methyl bromide, methyl iodide, ethyl chloride, ethyl bromide, ethyl iodide, propyl bromide, propyl iodide, butyl bromide, butyl iodide, isobutyl bromide, hexyl bromide, allyl bromide and allyl iodide as well as dimethyl sulphate and diethyl sulphate.

The bis-halogenalkoxy-alkanes of the general Formula IX which are starting materials for the third general process for the production of the new diammonium compounds, such as 1,2-bis-(δ-bromobutoxy)-butane can be obtained for example by reacting bis-(hydroxyalkoxy)-alkanes with phosphorus halides. Bis-(hydroxyalkoxy)-alkanes are obtained e. g. by reacting α,ω-dihalogen-alkanes with excess α,ω-alkane diols by means of sodium. The tertiary substituted benzylamines which are necessary as second reaction component in this process are easily obtained e. g. by reacting benzylhalides with the corresponding secondary amines.

As the pharmacological activity of the salts according to this invention depends chiefly on the cation, the type of anion is of lesser importance for the purpose of this invention. Only salts of such inorganic or organic acids should be used for therapeutical purposes which are not in themselves strongly toxic and so do not cause pharmacological side effects. In other respects, the choice of anion depends on various other factors such as cost of acid or of quaternating agent, facility of reaction, capability to form crystals (possibility of purifying) and water solubility of the products. The most suitable acid is easy to find from case to case by a few tests.

Compounds in which $An^-$ is different from $Hal^\ominus$, $(-O-SO_2-O-R)^-$ or $(Aryl-SO_2-O)^\ominus$, are produced advantageously by later exchange of these for other anions.

The diquaternary salts are almost colourless compounds which crystallise or sometimes they are in the form of yellow viscous oils. Particularly organic solvents or suitable mixtures thereof such as mixtures of those which generally dissolve well like alcohols with those which do not dissolve so well such as acetone or ethyl acetate or those which only dissolve slightly such as ether or benzene are suitable for the formation of crystals. In general, these salts dissolve well in water with a practically neutral reaction.

The diammonium compounds produced according to the present invention can be used for pharmaceutical purposes. In particular they influence the muscle tonus. They have an action similar to curare, some have a spasmolytic action also.

The following examples serve to further illustrate the invention. Parts are always given as parts by weight, preferably in grammes. The relationship of parts by weight to parts by volume is as that of grammes to cubic centimetres. The temperatures are in degrees centigrade.

EXAMPLE 1

*1,10-bis-[β-(dimethyl-benzyl-ammonium)-ethoxy]-decane dichloride*

3.16 parts of 1,10-bis-(β-dimethylamino-ethoxy)-decane, 3 parts of pure benzyl chloride and 20 parts by volume of butanone are boiled under reflux for about 14 hours. The quaternary salt which separates as a viscous oil is dissolved by the addition of a little abs. methanol and heating. On being left to stand in the cold, the product crystallises. It is filtered off under suction, washed with acetone and dried in the vacuum at 50–60°. M. P. 145–146°.

EXAMPLE 2

*1,10-bis-[γ-(dimethylbenzyl-ammonium)-propoxy]-decane dichloride*

3.44 parts of 1,10-bis(γ-dimethylamino-propoxy)-decane and 3 parts of pure benzyl chloride are heated for 14 hours in a bath at 90–100° while excluding all moisture. The product is cooled, and crystallised by rubbing with dry acetone, it is filtered off under suction, washed with a little acetone and then with abs. ether and dried in a high vacuum at 50–60°. The hygroscopic product melts at about 155°.

EXAMPLE 3

*1,10-bis-[β-(dimethyl-4-methylbenzyl-ammonium)-ethoxy]-decane dibromide*

3.16 parts of 1,10-bis-(β-dimethylamino-ethoxy)-decane, 20 parts by volume of dry acetone and 4 parts of 4-methyl-benzyl bromide are boiled for about 14 hours under reflux. The product precipitates in solid form; after cooling it is filtered off under suction, washed with acetone and if desired, recrystallised from isopropanol+ butanone. It melts at about 110°.

EXAMPLE 4

*1,10-bis-[β-(dimethyl-4-methoxybenzyl-ammonium)-ethoxy]-decane dichloride*

The same procedure as described in Example 3 is followed using 3.5 parts of 4-methoxybenzyl chloride instead of 4-methylbenzyl bromide. The oily salt which first precipitates crystallises on standing. By the addition of isopropanol until a solution is formed, it can be recrystallised from hot butanone. It melts at 133°.

The following compounds for example can be produced in an analogous manner:

1,8 - bis-[β-(benzyl-dimethyl-ammonium)-ethoxy]-octane dichloride, 1,9 - bis - [β-(benzyl-dimethyl-ammonium)-ethoxy]-nonane dichloride, 1,10 - bis - [β - (4' - fluorobenzyl-dimethyl-ammonium)-ethoxy]-decane dibromide, 1,10 - bis - [β - (3',4'-dimethoxybenzyl-dimethyl-ammonium)-ethoxy]-decane diiodide, 1,10 - bis - [β - (4' - ethoxybenzyl-dimethyl-ammonium)-ethoxy]-decane di-iodide, 1,10 - bis - [β - (3',5'-dimethylbenzyl-dimethyl-ammonium)-ethoxy]-decane dibromide, 1,10 - bis - [β-(4'-isopropylbenzyl-dimethyl-ammonium)-ethoxy]-decane dibromide, 1,10 - bis - [β - (4' - bromobenzyl-dimethyl-ammonium)-ethoxy]-decane dichloride, 1,10 - bis - [β - (benzyl-pyrrolidinium)-ethoxy]-decane dibromide, 1,10 - bis - [β - (benzyl - 2',5' - dimethylpyrrolidinium)-ethoxy]-decane dibromide, 1,10 - bis - [β - (benzyl-piperidinium)-ethoxy]-decane dichloride, 1,10 - bis - [β - (benzyl-2-methylpiperidinium)-ethoxy]-decane dichloride, 1,10 - bis - [β - (benzyl - morpholinium) - ethoxy]-decane di-bitartrate, 1,10 - bis - [β - (benzyl - 3',5'-dimethylmorpholinium)-ethoxy]-decane dibromide, 1,10 - bis -[β - (benzyl-diethyl-ammonium)-ethoxy]-decane diiodide, 1,10 - bis - [γ - (4'-methylbenzyl-dimethyl-ammonium)-propoxy]-decane dibromide, 1,10 - bis - [γ - (4' - chlorobenzyl-dibutyl-ammonium)-propoxy]-decane dibromide, 1,10 - bis - [δ - (4' - methylbenzyl-dimethyl-ammonium)-butoxy]-decane dibromide, 1,11 - bis - [β - (benzyl - dimethyl-ammonium)ethoxy]-undecane dichloride, 1,11 - bis - [β-(benzyl-methyl-ethyl-ammonium)-ethoxy]-undecane dibromide, 1,12 - bis - [β-(benzyl-dimethyl-ammonium)-ethoxy]-dodecane dichloride, 1,12 - bis - [β - (4' - methoxybenzyl-diethyl-ammonium)-ethoxy]-dodecane dichloride, 1,12 - bis - [β - (benzyl-dipropyl-ammonium)-ethoxy]-dodecane dibromide, 1,13 - bis - [β - (benzyl-dimethyl-ammonium)-ethoxy]-tridecane dichloride, 1,14 - bis - [β-(4'-methoxybenzyl-dimethyl-ammonium)-ethoxy]-tetradecane diiodide, 1,14 - bis - [β - (3',4' - dichlorobenzyl - diethyl - ammonium)-ethoxy]-tetradecane dibromide, 1,15 - bis - [δ - (2' - methoxybenzyl-dimethyl-ammonium)-butoxy]-pentadecane diiodide, 1,16 - bis - [β - (benzyl-dimethyl - ammonium) - ethoxy]-hexadecane-di-p-tolyl sulphonate, 1,16 - bis - [β - (3',4' - methylendioxybenzyl - dimethyl-ammonium)-ethoxy]-hexadecane diiodide, 1,13 - bis - [β - (benzyl - diethyl - ammonium) - ethoxy]-octadecane diiodide, 1,20 - bis - [β - (benzyl - dimethyl - ammonium)-ethoxy]-eicosane dichloride.

EXAMPLE 5

11.6 parts of 1,10-bis(β-bromo-ethoxy)-decane and 25.0 parts of N-methyl-3,4-dimethoxybenzylamine are mixed together and heated for 6 hours on a boiling water-bath. After cooling the whole is dissolved in diluted hydrochloric acid. Impurities are removed from the solution by ethering out and filtering through charcoal. The filtrate is made strongly alkaline by adding 30% sodium hydroxide solution and the bases which separate are extracted with ether. The ethereal solution is dried with potassium carbonate, the ether is distilled off and the N-methyl-3,4-dimethoxybenzylamine is distilled off in a high vacuum (less than 10⁻³ mm.) at a temperature of about 100°. Charcoal is added to the remaining warm residue and after filtering the 1,10-bis[β-(methyl-3',4'-dimethoxybenzyl-amino)-ethoxy]-decane is obtained as a viscous slightly yellow oil.

5.9 parts of this product are dissolved in 50 parts by volume of acetone and 3.0 parts by volume of methyl-iodide are added under cooling. The whole is then boiled under reflux for about 10 hours, whereby the quaternary salt separates as a viscous oil. It is purified by dissolving in hot water and filtering through charcoal. The quaternary salt is obtained from the filtrate by evaporation in vacuo as a viscous yellow oil. Perchlorite M. P. 92–93°.

What I claim is:

1. A diammonium compound of the formula:

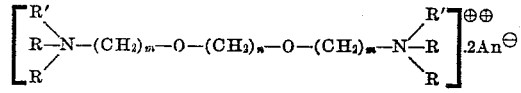

wherein

represents a member selected from the group consisting of lower dialkylamino radicals, piperidino, methyl-piperidino, pyrrolidino, methyl-pyrrolidino, morpholino and methyl-morpholino, and R' represents a member selected from the group consisting of benzyl, lower alkyl-benzyl, lower alkoxy-benzyl, methylenedioxy-benzyl and halogen-benzyl,

*m* represents an integer from 2 to 4,

*n* represents an integer from 8 to 20, and

An$^\ominus$ represents a member selected from the group consisting of the anions Cl$^\ominus$, Br$^\ominus$, I$^\ominus$ and

2. 1,10-bis-[β-(dimethyl-benzyl-ammonium)-ethoxy]-decane dichloride.

3. 1,10-bis-[β-(dimethyl-benzyl-ammonium)-propoxy]-decane dichloride.

References Cited in the file of this patent

FOREIGN PATENTS 841,917 Germany _____ June 19, 1952

OTHER REFERENCES

Unna et al., Annals of the New York Academy of Sciences 54, (art. 3) 425 (Oct. 30, 1951).

Girod et al., Experientia 8, 233–234 (1952).